May 31, 1966 K. A. TUTTLE 3,254,202
AUTOMATIC SWING CURVE CALCULATOR AND PLOTTER USED TO
INDICATE TRANSIENT STABILITY OF POWER GENERATORS
Filed Nov. 2, 1962 5 Sheets-Sheet 1

FIG.1

INVENTOR
KENNETH A. TUTTLE
BY
ATTORNEYS

FIG. 5

INVENTOR
KENNETH A. TUTTLE

FIG. 6

INVENTOR
KENNETH A. TUTTLE

United States Patent Office 3,254,202
Patented May 31, 1966

3,254,202
AUTOMATIC SWING CURVE CALCULATOR AND PLOTTER USED TO INDICATE TRANSIENT STABILITY OF POWER GENERATORS
Kenneth A. Tuttle, Portland, Oreg., assignor to the United States of America as represented by the Secretary of the Interior
Filed Nov. 2, 1962, Ser. No. 235,164
7 Claims. (Cl. 235—151.21)

The invention herein described and claimed may be manufactured and used by or for the Government of the United States of America for governmental purposes without the payment of royalties thereon or therefor.

This invention relates to a dynamically operated system for simulating particular cooperative relationships between an alternating current power network and means generating power for supplying the network. Automatic recording means made operative in the system, produces graphical representations of the transient stability of the power generators when the network is subjected to disturbance conditions. Commonly referred to as swing curves, these representations relate the electrical phase angles of the various power generators as they appear relative to each other, over a time period corresponding to that during which the disturbance and the aftermath effects produced thereby occur. Swing curves facilitate the study of transient-stability problems encountered in the parallel operation of synchronous machines connected to power networks having long-distance transmission lines. Most frequently such problems arise from the interconnection between two or more power systems to a network for the purpose of exchanging power to obtain economies in generation or to provide reserve capacity. A short circuit or similar major disturbance in one or the other of the interconnected system, invariably causes a sudden redistribution of the loads, wherein underloading and overloading of the generators occur to create and instability, or a loss of synchronism among the generators. The system according to the invention allows the imposition of serious electrical disturbances upon an arrangement wherein power means simulating the operation of generators, are interconnected in a network of lines in which loads are distributed to simulate the power consuming areas in an actual power network. Moreover, in this system the power means cooperates with a plurality of phase sensing and computing channels, each of which is operatively affected by the functioning of the others. The system's automatic recording means receives inputs from all such channels to provide a pattern descriptive of the operative relationships among the generators.

A primary object of the invention is to provide a system including recording apparatus, simulating the performance of power generators in association with a power absorbing network wherein an operational discontinuity in the network becomes evident in a record made by the recording apparatus, such record being indicative of a pattern of variations in the simulated generator operation caused by the discontinuity.

A further object of the invention is to provide in a system having automatic apparatus to plot swing curves representative of the transient stability of the phase angles represented in power from electronic amplifiers simulating generators, the analysis of whose power producing performance under a disturbance condition, is desired.

A still further object of the invention is to provide a system having apparatus automatically controlling the operation of analog computing components, for producing a record indicating the performance of large alternating current power generators and power distributing transmission lines in a network, characterized by the presence therein of power disturbing transient conditions.

Other objects and advantages of the invention will become more apparent from the following detailed description taken with reference to the accompanying drawing wherein.

Background of the invention

Heretofore, methods used to derive swing curves in connection with stability studies of the multiple generator complexes of large power networks, required much time and effort since they involved repetitive procedures in step-by-step solutions. As described in Power System Stability, volume 1, by Edward W. Kimbark, published by John Wiley & Sons, New York (1948), such methods are started in the usual manner by determining the various impedance loads corresponding to the A.-C. machines and other equipment, and the connecting lines, associated with the networks of the individual generators, to facilitate the drawing of an impedance diagram based thereon. The magnitudes and initial phase positions of the internal voltages of all the synchronous machines are then derived from the solutions of the various network relationships. Thereafter, to proceed with the compiling of the data needed for forming the swing curves, requires that the network be analyzed in the same way many times over to obtain the power outputs of all the machines as their electrical phase relationships and internal voltage of all the synchronous machines are then derived from the solutions of the various network relationships. Thereafter, to proceed with the compiling of the data needed for forming the swing curves, requires that the network be analyzed in the same way many times over to obtain the power outputs of all the machines as their electrical phase relationships and internal voltages are discerned by such analysis and computations.

More particularly, in carrying out of the step-by-step procedures, use is made of a network analyzer which comprises several meter and plugboard consoles into which are connected various adjustable resistors, reactors, capacitors, sources of A.-C. voltage adjustable in phase and in magnitude, with provision being made for operatively relating the various parts as needed to achieve the network to be simulated. Also provided are instruments for measuring scalar and vector values of voltage, current, and power anywhere in the network. Since operation of the analyzer is conducted on a single phase basis, each phase of a three-phase network is considered separately. The stability study is continued by setting up on the A.-C. analyzer, a scaled simulation of the network, the generators being represented by their direct-axis transient reactances in series with power sources. Normal, or rated operating conditions are set up by adjustably selecting the appropriate phase and magnitude of the voltages of the various power sources being represented, and the impedances of the loads associated therewith. The disturbance or fault condition, is applied as a short circuit on the network by a connector cable plugged into suitable sockets in the analyzer console, which leads a point on a power line direct to the neutral bus. Readjustments are then made to restore the voltages of the power sources to the magnitudes they had before the imposition of the fault. This may be done since under actual conditions in A.-C. generators having good voltage regulation, the effective impedance present in the generator system during a short circuit is nearly all transient reactance defining the inductance of the transmission line from the short. As a result, significant real current is not found in the shorted line, and there is no added load to disturb the instant predetermined value of the voltage on the generators. Having restored the voltages as indicated, the power output of each generating machine is ascertained by means of a wattmeter, and the accelerating power is computed whereby the angular change of each such generator during the time interval involved may be found from the relationship:

$$M\frac{d^2\delta}{dt^2}=Pa=Pi-Po$$

where:

$M=I\omega=$ the angular momentum of the rotating elements of the generators, I being the moment of inertia, and $\omega$ the angular velocity of the rotating elements.

$\delta=\theta=\omega_1 t=$ angular displacement of the rotating element or rotor with respect to a reference axis rotating at normal speed. $\theta$ being the angular position of the rotor, and $\omega_1$ is its rated normal synchronous speed.

$Pi=$ is the shaft power input.

$Po=$ is the electrical power output.

$Pa=$ is ohe accelerating power, or difference between the input and output powers, each corrected for losses.

$t=$ time.

Solution of the relationship for $\delta$ as a function of time, provides relative phase angle data for initiating the development of the graph constituting the swing curve.

Having determined a set of related angular changes for the disturbed generators, the angle-adjusting dials of the power sources of the network analyzer are set in accordance therewith. Following this setting, the power readings are again taken, and the further displacements of the rotors are detremined as before. Repeating this procedure a number of times therafter, provides a series of time displaced ordinate point sets determining the swing curves of the various generators involved. At a proper time in the test, the short circuit disturbance, or fault may be cleared by switching the appropriate plugged-in connections on the analyzer board. Determinations of the relative displacement angles are continued until it appears that the generators will come into a synchronous relationship. For a more comprehensive explanation of the swing equation and its solution, reference may be made to chapter II of the aforementioned text by E. W. Kimbark.

*General description of the invention*

Figure 1:
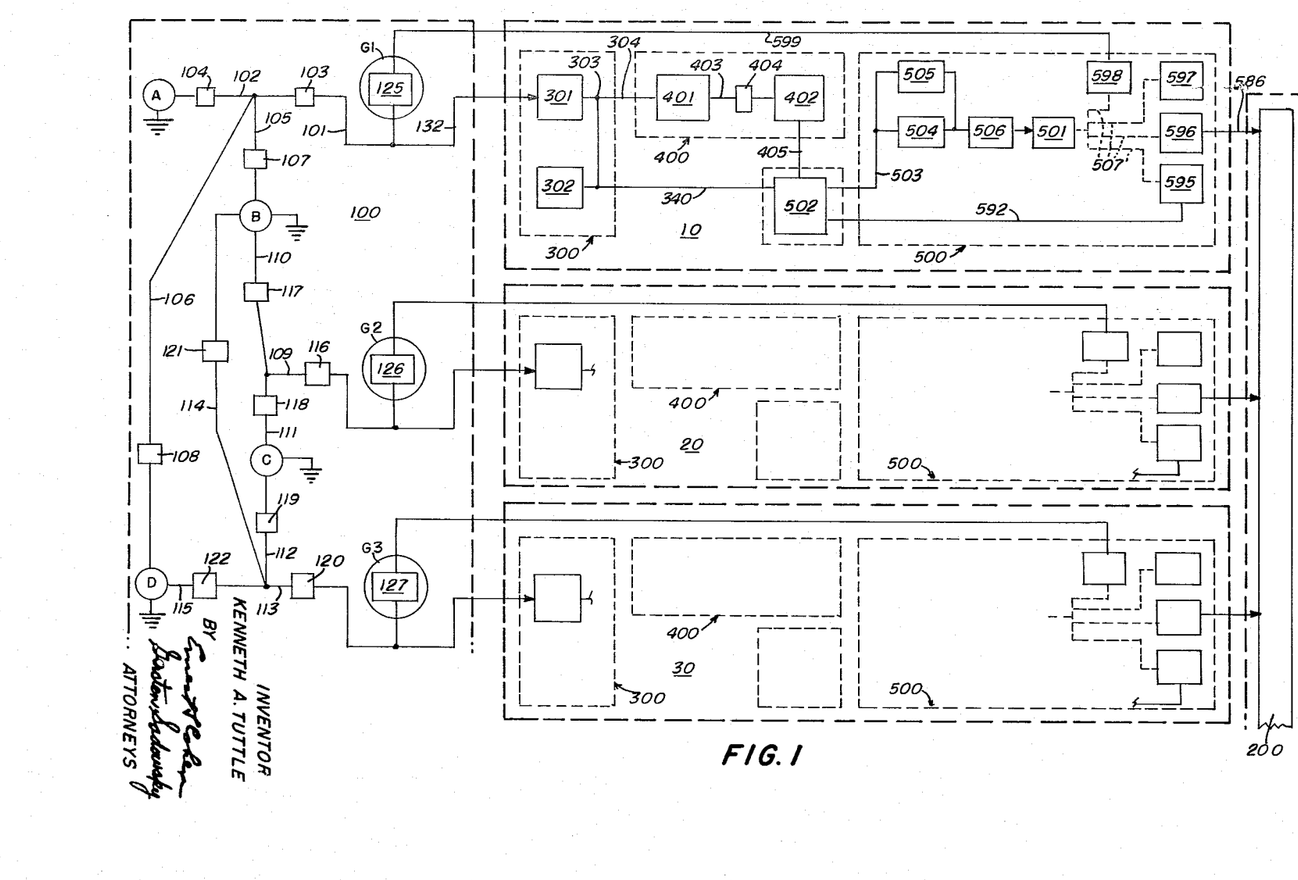
FIG. 1 is a schematic showing of the structural relationship among the major components of the over-all apparatus comprising the system of the invention.

By means of the system according to the present invention, a number of swing equations are solved at the same time, in a rapid and continuous manner, and graphical representations based on these solutions are accomplished simultaneously therewith by an automatic recording apparatus. This system as shown in the generalized schematic diagram of FIG. 1 is made up of an A.-C. network analyzer 100, and an automatic recording apparatus 200, having between them a plurality of phase revolving channels 10, 20, 30 . . . cooperating therewith, wherein each such channel includes an arrangement of parts such as shown in FIG. 1 for the channel 10. Sub-arrangements of these parts are indicated in the figure to comprise an A.-C. to D.-C. phase-shift power detector 300, an analogue computing circuit 400, and a servo-drive positioning mechanism 500. Since the resolving channels are all identical in respect to their structural form, and their cooperation with the analyzer and recording apparatus, as well as with each other, disclosure thereof will be made solely in connection with channel 10. Nearly all of the individual components to be disclosed are commercially available in various forms which would be suitable for use in the system. However, a full description will be given of so much of each of the components as is considered necessary to disclose their cooperation in the overall system constituting the invention.

Figures 2, 4:
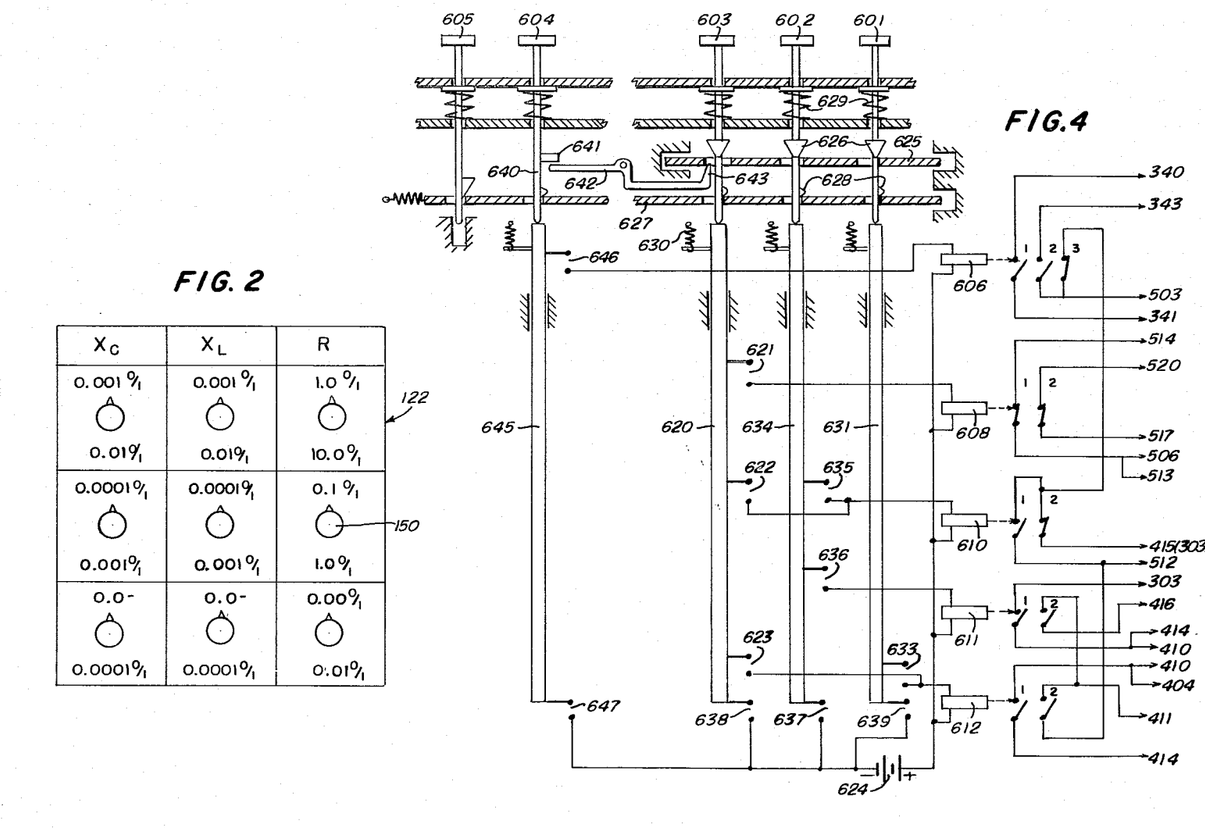
FIG. 2 is a diagrammatic showing of the arrangement of setting dials on impedance decade boxes which are adjustable to predetermine the load in the network analyzer.
FIG. 4 is a schematic illustration of a channel switching circuit to be made operative by operational mode control buttons.

Within the circuits comprising the analyzer 100, are representations of four power consuming areas A, B, C, D, arranged to receive their power from various combinations of the power generating stations G1, G2, and G3. Within lines 101, 102, representing the power transmission circuitry joining generator G1, and area A, there are connected settable impedance boxes 103 and 104, adapted to provide for the system, the internal and associated impedances of the generator G1, and the impedance associated with the transmission lines and the load of area A, respectively. Impedances corresponding to the loads of areas B and D, and of their respective transmission lines 105 and 106, are provided by settable impedance boxes 107 and 108, respectively. Similarly, lines 109 to 115 inclusive have connected therein the respective settable impedance boxes 116 to 122 inclusive, the correspond as indicated in FIG. 1, to the internal and associated impedances of the generators G2 and G3, and the impedances of the transmission lines and loads associated with areas B, C, and D. Each of the settable impedance boxes may be in the form of conventional decade boxes, each of whose arrangement of adjustable dials 150 are like that shown in FIG. 2, for the impedance box 122. Scale values inscribed around the dials 150 are in accordance with a per-unit (0/1) quantity notation. In an exemplary design for a decade box usable with a network analyzer operating at 480 cycles per second, suitable bases for the calibrations are a unit operational load of inductive reactance $X_L$, equal to $2\pi fL$, where L is 0.33157 henries, and a unit load of capacitive reactance $X_C$, equal to $$\frac{1}{2\pi fc}$$

where C is 0.33157 microfarads, and a unit load of resistive impedance is equal to 1000 ohms. Considerable convenience is provided by the use of this per-unit notation since quantities such as current, voltage, power and impedance may be expressed as decimal fractions, or multiples of base quantities, the latter referring to the rated or full-load values of a particular type of apparatus. Moreover, per-unit impedances based on the apparatus rating are nearly the same for all apparatus of the same general design though of different voltage and kilo-volt-ampere ratings, whereas the impedances in ohms would normally vary greatly with the rating. A more detailed explanation of this notation, and formulas for converting self-impedances from ohms to per-unit and reverse, are set out in the aforementioned text Power System Stability, pages 54 to 56.

System apparatuses for simulating the generators G1, G2 and G3, are all alike, wherein they comprise electronic amplifiers 125, 126 and 127, respectively, each of which is designed to operate with positive and negative feedback currents such that the zero impedance achieved thereby provides a constant voltage regulation to more nearly simulate the actual performance of a synchronous machine. An amplifier of this nature is more fully disclosed on page 477 of the article An Analogue Computer for Automatic Determination of System Swing Curves, by Shen and Lisser, in the AIEE Transactions, Part III, for November 1954, pages 475 to 483. Reference may also be made to the Radio Engineers' Handbook by Terman, published by McGraw-Hill (1943), pages 402 to 406, for a detailed discussion of the theory and applications of negative-positive feedback circuits to regulate amplifiers of the type required for amplifier 125. A line 599 from the servo-drive arrangement 500, joins the output of a controlling synchronous transformer 598, as an input for the amplifier 125, to control the phase characteristics of the power supplied by the amplifier, and a circuit 132 connects a power measuring device in the detector arrangement 300, to the amplifier to detect and measure the power supplied thereby having these characteristics.

Arrangement 300 comprises a wattmeter-rectifier device 301, which accurately measures the true alternating current power to be sensed at the output terminals of amplifier 125, and produces a direct-current output exactly in conformance therewith. This power is defined by the conventional relationship $EI \cos \theta$ watts, but wherein the angle $\theta$ reflects a weighted effect of the relative phase angle characteristics in all of the generators being simulated by amplifier operation in the system. This follows from the fact that line 132 supplying the device 301, is connected to the generator output line 101, and through this line and the network load joined thereto, device 301 looks back into the analyzer to sense a measure of the phase characterisitcs of all the generator outputs as will be hereinafter more fully explained. A circuit 302, producing a direct-current reference voltage at the junction 303, is suitably adjustable to supply a voltage equal and opposite to the D.-C. output of device 301 when all system amplifiers are functioning to simulate generator operation at normal, or rated load and voltage, and there is an absence of any fault in the network. In those circumstances there is no output on a line 304 from the arrangement 300. Conditions present when the system is applied to study the effects of a fault in the network, cause an output on line 304 to be variable in accordance with the effect of phase shift engendered by the fault, and which represents a direct measure of the accelerating energy available to displace a generator rotor out of synchronism with the rotating reference axis of the synchronous machine.

Computing circuit 400 comprises a first integrator circuit 401, and a second integrator circuit 402, receiving the output of the first integrator through a circuit 403 including an adjustable potentiometer 404. There is provided by the latter, a means to preset for the system, a scaling effect introduced to simulate the inertia of the rotating parts associated with a generator, for appropriately modifying the rate and magnitude of the rotor displacement which was indicated by the shifting phase developed by the reactions in the network. The computing circuit solves the equation $$M\frac{d^2\delta}{dt^2} = Pa = Pi - Po$$

to which reference was made previously in connection with the discussion of the step-by-step method of deriving the swing curve, for the system's referenced displacement angle $$\delta_0 = \frac{K_1 K_2}{M} \int_0^t \int_0^t (Pi - Po) dt dt$$

$K_1$ and $K_2$ are the operating time constants for the first and second integrators respectively, and each is equal to the conventional $1/RC$ value as found in respect to the resistive (R), and capacitive (C), components of the respective circuits. Angular momentum M in the equation solving for the time displacement angle, takes the form of a value of stored kinetic energy at rated speed, and becomes the inertia constant for the gnerator concerned. Therefore, adjustment of the potentiometer 404 introduces the constant M as determined from an appropriate consideration of the structural and operating features of the synchronous machine simulated by channel 10. Further relating the terms of the equation for the time displacement angle $\delta$, to the potentials derived by the circuit components of the channel 10, it is evident that $Pi$, the rated power input of the generator 125, is the factor preset in circuit 302 to provide a D.-C. reference voltage to bias junction 303, and that $Po$ is the generator output power as measured by detector 301, and also applied as a D.-C. voltage to junction 303. Consequently, the voltage difference $(Pi-Po)$, at junction 303, represents the accelerating power $Pa$, which is available to displace the generator's rotating elements relative to its rotating reference axis. The subsequent sequential integration of the accelerating voltage quantity $Pa$, with respect to time, in the computing circuits 401 and 402, obtains for the system a voltage representing the angle $\delta$, through which the rotor is to be displaced relative to the reference axis of the generator.

Circuitry of arrangement 500, comprising a servo motor means 501, functions to translate the displacement angle voltage sensed on its input lead 405, into a positioning drive for a rotor in control transformer 598, a phase angle indicator 597, and sliding contacts on potentiometer circuits 596 and 597, deriving voltages to control the operation of the automatic recorder 200, and to supply a servo feedback voltage to a differential resistance voltage summation circuit 502, respectively. An output from circuit 502, which is dynamically changing to represent the voltage difference between the displacement angle and servo feedback voltages, is supplied on lead 503, as an error voltage to a conventional servo amplifier 504. Connected across the amplifier 504 is a compensating circuit 505, made operative to avoid unstable oscillations in the output of the amplifier. A magnetic amplifier 506, receives the output from the servo amplifier, and provides a control voltage to the motor circuits of drive means 501. Drive shafts 507, indicated by the dash lines in FIG. 1, are mechanically linked to the motor drive by a gear transmission and slip clutch, and are thereby made effective to position the controlling elements of components 595 to 598.

*Detailed description*

Figure 3:
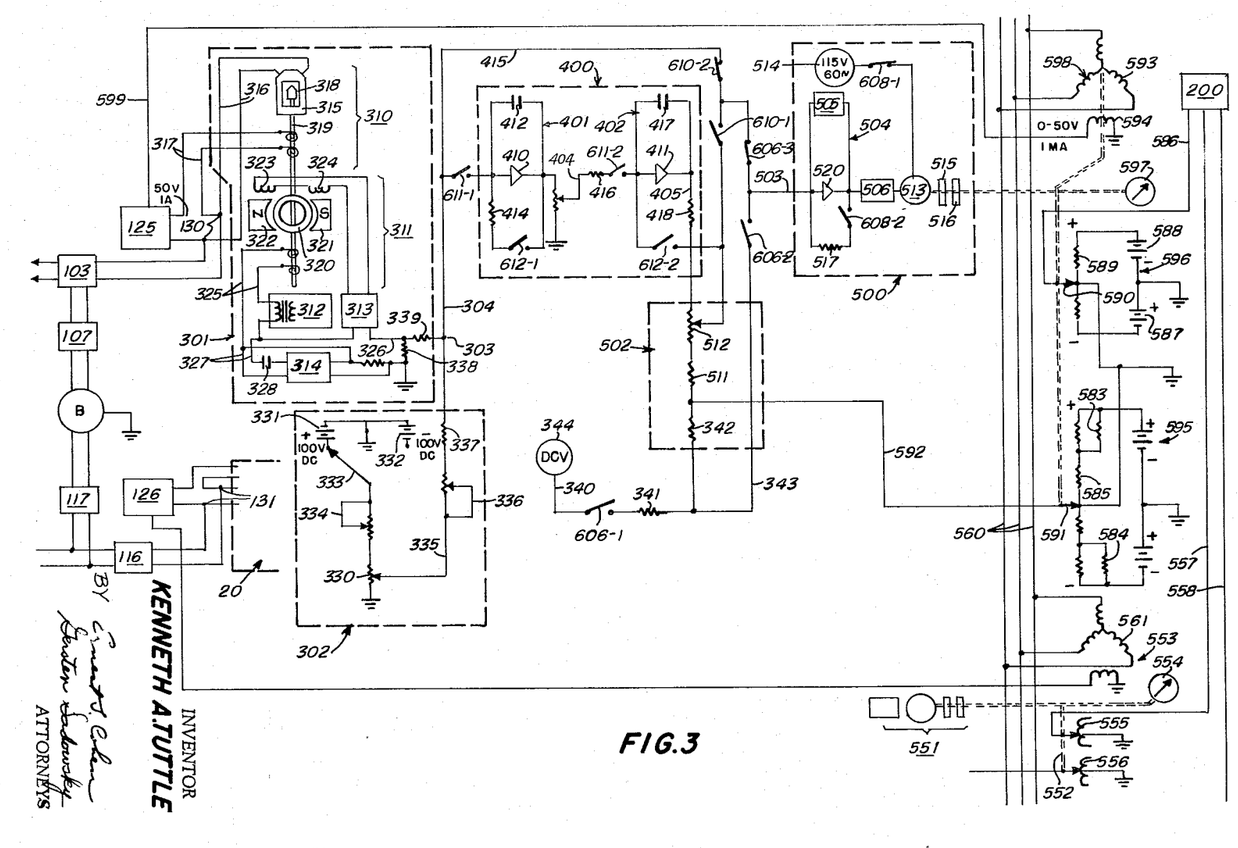
FIG. 3 is a schematic showing similar to FIG. 1, further illustrating the details of several of the major components.

Wattmeter-rectifier device 301, is more fully shown in FIG. 3 to comprise a dynamometer assembly 310, a torque balance induction assembly 311, an amplifier-oscillator 312, a phased rectifier 313, and a damping amplifier 314. Output voltage from the amplifier 125 is sensed across its output terminals 130 and supplied on lines 316 to a stationary field coil 315 in the dynamometer 310. Current output of the amplifier is fed on lines 317, to a coil 318 mounted on a shaft 319, and angularly displaceable therewith within the field coil 315. The torque imposed upon shaft 319 as a result of the magnetic fluxes produced in coils 315 and 318, is automatically balanced by the reaction in the direct current torque balance induction assembly 311, comprising a coil 320 fixed to the shaft 319, and displaceable therewith between iron pole pieces 321, 322 of a permanent magnet having powdered iron inserts. A steady flux in the solid iron pole pieces links the moving coil 320, and a 200 kc. field is produced in the powdered iron inserts by means of induction field coils 323, and 324 attached to the magnet structure. The oscillator within amplifier 312 supplies the excitation to the induction field, and any A.-C. signal of about 200 kc., induced in the moving coil 320 is received on lines 325, and amplified. With no current in the dynamometer coils 315 and 318, the movable coil 315 is maintained in a position where the D.-C. moving coil 320 does not link the 200 kc. flux. As current is applied to the dynamometer coils, a torque is produced causing the angular displacement of the coil 318 and the shaft 319. The D.-C. moving coil 320 is similarly displaced by shaft 319, and as a result links the 200 kc. flux to produce a signal on lines 325, which is amplified in 312, rectified in rectifier 313, and fed back as a direct current to produce a torque in assembly 311 exactly equal to the torque in dynamometer 310. The rectified current from 313 is also supplied to line 326, whereby a measure of the power output from the amplifier 125 is made available. The torque produced by the dynamometer element 310 is directly proportional to the in-phase product of the input currents supplied to the coils 315, and 318 by the output of amplifier 125. The counter torque developed in assembly 311, is equal to the torque of assembly 310, and this counter torque is proportional to the D.-C. output current on line 326. Therefore, the in-phase product of the input currents and the output direct current are directly proportional to each other. Consequently, the value of the output D.-C. voltage on line 326 may be relied upon to accurately follow and thereby be indicative of any change in the phase relationship of the currents reflecting the power detected at the output terminals 130 of the amplifier 125. Damping amplifier 314 is provided to supply a diminishing torque to the moving parts of the wattmeter since the damping of the D.-C. mechanism is insufficient due to the relatively high moment of inertia of the moving elements and high electrical torque applied to the moving system. This amplifier responds to the output current change and feeds back on lines 327, through a differentiating capacitor 328, a rate of change counter current to the movable coil 320 to effectively oppose the change. For additional details concerning the circuits and compensation network of the phase sensitive wattmeter-rectifier 301, reference may be made to the article The Inductronic Electrodynamometer for the Precise Measurement of Voltage, Current, Power, and Energy, by R. F. Estoppey, in the AIEE Transaction Paper 59-166.

Reference voltage circuit 302 is shown in FIG. 3 as comprising a series circuit completed through ground, including a power balance setting potentiometer 330, a trimming potentiometer 334, and either a positive source 331 or negative source 332 of D.-C. voltage selectively connectible to the circuit by a single pole, double throw switch 333. The adjustable tap of potentiometer 330 is joined to reference voltage junction 303 by a lead line 335 in which are serially connected a trimming potentiometer 336, and a fixed resistance 337. As hereinbefore indicated, the magnitude and polarity of the reference voltage at junction 303, as set by circuit 302, is predetermined to be equal and of opposite polarity to the D.-C. voltage supplied to junction 303 by the output circuitry of wattmeter-device 301, when the amplifier is producing power representing rated, or normal load of the generator simulated. This output circuitry includes a fixed resistor 338 connected to ground and across the output of the phased rectifier 313 of the wattmeter device, and the wattmeter output circuit lead 326 which connects in series the ungrounded end of the resistor 338, and a fixed resistor 339, to the junction 303. To preset reference circuit 302, it is disconnected at junction 303 whereat voltage to ground is then measured at rated load output set in the amplifier. With the wattmeter output circuit open at junction 303, a voltage measurement is taken of the reference circuit output to ground at junction 303, and potential source selection and potentiometer adjustments are made to provide a D.-C. voltage reading equal and opposite to that previously measured in the wattmeter output circuit. Accordingly with both circuits closed at junction 303, the output therefrom to ground at rated output from the amplifier, is zero.

When wattmeter circuit 301 detects on the output leads of the amplifier 125, any deviation from the normal power at rated load, the D.-C. voltage supplied to the wattmeter lead 326 changes accordingly, and a resultant voltage is obtained on the lead 304 connecting the junction 303 to the computing circuits 400. This deviation in power may in fact correspond to a load drop on the output of a generator such as would be due to a fault in a transmission line of the network supplied by the generator. An immediate effect of such reduction in the demand upon a large generator driven by a turbine or water wheel, is a speeding up, and a displacement of the generator rotor relative to its rotating reference axis. Simulation of the transmission line fault on the analyzer network, operates as in the actual case, to eliminate a measure of impedance on the output circuit of the amplifier, whereby the load drawn on the power output of the amplifier is diminished. Wattmeter circuit 301 detects and measures this reduced power output, and supplies a correspondingly reduced D.-C. voltage at junction 303. Therefore, the resulting unbalance voltage which is supplied on line 304 to the computing circuits to be integrated, is equatable to the accelerating power from the turbine or water wheel, impressed upon the generator rotor as a consequence of the load loss thereon, induced by the fault. This is the accelerating power which acts upon the rotor to displace it relative to a rotating reference as noted previously, with a resultant shift in the phase relationships defining the power produced by the generator. Hence, it follows that the voltage derived at the output of the computing circuit 400 would effectively control the servo drive 501 to position a rotor 594 of the phase shift control transformer 598, to correspond to the time referenced displacement of a rotor in a synchronous generator subject to the power lessening effect of a fault in a transmission line associated therewith.

As shown in FIGS. 1 and 3, the adjusted potentiometer 404 is connected between the integrator circuits 401 and 402, whereby it modifies the signal from the first integrator 401, to account for the retarding of the rotor speed-up due to the inertia factor, as was hereinbefore explained. Integration of the modified signal in second integrator 402, provides on lead 405, and across resistor 418, a signal representing the rotor's angular displacement, for input to the differential resistance summation circuit 502, comprising resistor 511, and a trimming potentiometer 512, in a series circuit. Calibration of the computing channel is facilitated by the potentiometer 512 which is adjustable to set the channel gain, in cooperation with potentiometer 336, which is adjustable to set the input gain. Also joined to circuit 502 is the feedback lead 592 from the servo-positioned tap on potentiometer 595, which provides a follow-up signal opposing the displacement signal input, to the extent of overcoming it, and eventually when the displacement signal voltage diminishes, to determine a servo control input which is effective to cause the servo elements to return toward their starting positions, in a manner well known in the art. A positioning drive from the servo controlled elements, is furnished by the operation of an A.-C. motor 513, connected to an appropriate source 514. The output drive from this motor is delivered through a gear box 515 and a slip clutch 516, to the several mechanical linkages 507 connected to the driven elements 595 to 598. Speed and direction of the motor drive is controlled by the error signal determined in the differential resistance summation circuit 502, and provided on line 503, to the circuit 504 including an operational amplifier 520, whose form and operation is similar to that of summing amplifiers 410 and 411 except that amplifier 520 amplifies but does not integrate. The magnetic amplifier 506, which is also energized from the A.-C. source 514, is controlled by the D.-C. output of the amplifier 520, and becomes effective thereby to control the operation of motor 513, as indicated. When activated by the motor operation, linkages 507 position the induction regulator rotor 594, the phase angle indicator 597, and sliders 590 and 591, on the potentiometers 596 and 595, respectively. Potentiometer 596 comprises a resistance 589 center-tapped to ground and having one end connected to a positive terminal of a D.-C. potential source 588, and its other end connected to a negative terminal of a D.-C. potential source 587, the respective alternate terminals of the potential sources 587 and 588, being grounded. Slider 590 is movable across the resistance 589, as directed by the servo drive, and on its output lead 586, provides a control voltage to the automatic recorder 200. The magnitude and polarity of this control voltage is indicative of the time related phase angle shift computed by the associated circuits of the channel. Potentiometer 595 for supplying the servo feedback voltage through its slider 591 and lead 592, comprises substantially the same circuit arrangement as that previously described for voltage divider 596. End portions of its center-tapped and oppositely poled resistance, have paralleled therewith one of the additional resistances 583 and 584, to obtain feedback signals providing coarse and fine speed control for the servo motor.

Channel 20 is represented broadly in FIG. 3, by connections thereto from output terminals 131 of the amplifier 126, and its servo components 551, and their linkages 552 to a phase shift control transformer 553, phase angle dial indicator 554, and potentiometers 555 and 556, and controlling the inputs to the recorder 200 and the servo feedback circuits, respectively. Three-phase A.-C. reference voltage lines 60, having conventional connections to the separate phase windings of the respective three-phase stators 593 and 561 of the control transformers 598 and 553, are shown extending beoynd the channels 10 and 20, to facilitate their similar connections to additional channels. It is the interaction between the channels 10, 20 and the channels following, in connection with their cooperation with the impedances such as decade boxes 103, 107, 116 and 117, comprising the network analyzer 100, that provides the simultaneous outputs on recorder input leads 586, 557, 558, etc., which determines the form of the swing curves produced by the recorder.

*Control for operational modes*

To allow any individual channel to be used for an evaluation of its related generator's operation in delivering a constant power output to an external network load, relay operated contacts are provided in the leads connecting the various parts of the channel. Such contacts are made operable to disrupt connections whereby the channel computing circuits may be by-passed. Other relay contacts provided in these leads are maintained closed whereby the channel's servo motor circuit is controlled by an error signal corresponding to the difference between the D.-C. voltage output from the wattmeter circuit 301, and a D.-C. voltage derived from the reference circuit 302, in which the value of the voltage is determined by the setting of potentiometer 330. This setting is made to conform to the constant power output predetermined for the generator being considered. Therefore, the error signal controlling the servo motor, is a function of any change in the output of the generator simulating amplifier which may result from load changes in the network supplied by the simulated generator. Since the servo motor always turns in a direction to minimize the error signal, the control over this generator exercised by the servo driven control transformer 598, would hold the generator output at a constant value in accordance with the selected setting on the reference potentiometer 330.

Operation of any one channel in the constant power mode requires that the energizing circuits of the other channels of the system are likewise in their constant power mode or else be made ineffective, as well as that the one channel selected for such operation be prepared therefor, by energizing the D.-C. operated relays having their contacts actuatable in the appropriate circuit connections of the various channels. An operational relay control arrangement for channel 10, is shown in FIG. 4 to comprise a number of electrically insulated push buttons 601 to 605, of which the push button 601 is for conditioning the channel to function in the constant power mode, and the push button 603 is for changing this control setting to one in which the channel reverts to a standby condition. When controlled by the standby button, a channel is made ineffective since it is placed in an inoperative condition wherein the A.-C. power to the magnetic amplifier and the servo positioning motor is disconnected, and all three operational amplifiers of the channel are placed in a reset condition. Thus, depression of standby button 603 in channel 10, shifts a contact bus bar 620 to close contact sets 621, 622, 623 and 638, and thereby complete circuits including a D.-C. source 624, to energize relays 608, 610 and 612. As shown in FIGS. 3 and 4, activation of relay 608, opens normally closed contacts 608–1, and closes the open contacts 608–2. In this manner the A.-C. power source 514 is cut off from the magnetic amplifier 506, and motor 513, and the operational amplifier 520 is conditioned to be reset across resistor 517. Activation of relays 610 and 612, cause the relay contacts associated therewith, to be actuated, whereby the opening of normally closed contacts 610–2, disconnects the servo system circuits from the power detecting and measuring circuits 301, 302, and the closing of contacts 612–1, and 612–2, conditions the operational amplifiers 410 and 411 to be reset across resistors 414 and 418 respectively.

Selection of channel 10 to be operated for a constant power study, requires that its control button 601 be depressed, and that the constant power or standby buttons be depressed in all other channels whereby the latter are set for constant power operation or made ineffective in connection with the operation of channel 10. Standby button 603 of channel 10 is made inoperative for depression in this instant, by means of a locking bar 625 which is shifted by the action of a wedge-like cam 626 on the stem of depressed button 601 whereby stem openings in bar 625 are displaced under the corresponding cams on the other button stems. A spring tensioned button retaining bar 627 also becomes effective to hold button 601 depressed by over-riding a projection 628 on the stem for this button, and since the projection 628 shifts the bar 627 as it moves through it, any other button depressed at the time will be released to return to a normal position by the action of an under head compression spring such as 629 associated with button 602. The contact bus bars coacting with the push button structures, are also urged to return to normal position with their associated buttons, by means of the tension of springs such as element 630 attached to bus bar 620. Button 601 being held in operated position, functions to maintain shifted a contact bus bar 631 whereby switch contacts 633 and 639 are closed to connect the D.-C. source 624 across relay 612 to energize the relay and actuate the contacts associated therewith. Contacts 612–1, closed by the operation of relay 612, protects the amplifier 410 setting it to zero by allowing computing capacitor 412, to slowly leak through its resistor 414. Normally open contacts 610–1 maintains disconnected the second integrator circuit 402 from the power measuring voltage to be sensed at junction 303 of the wattmeter circuit. In addition, contacts 612–2 are actuated and close a circuit through elements 512, 418, and 405 through which integrator 402 capacitor 417 can discharge. Normally closed contacts 610–2 connects line 415 from summing junction 303 through normally closed contacts 606–3 to line 503 which supplies an input for the servo amplifier circuit arrangement 504. Normally closed contacts 608–1 maintain the 60 cycle A.-C. source connected to the servo magnetic amplifier 506, and motor 513. Normally open contacts 608–2 remain open, and the circuit for resistor 517 across the amplifier 520 is therefore incomplete and ineffective. With the computing circuits made ineffectual to compute by reason of the aforementioned relay control, and a completed input power-servo control voltage circuit available through lead 415, contacts 610–2 and 606–3 and lead 503, the servo system is operative to follow directly any change in the power measured at the generator simulating amplifier 125. As a result, the servo positioned rotor 594 of the phase shift control transformer, supplies an appropriate phase corrective control input to this amplifier whenever it tends to drift from the predetermined constant power preset on the adjustable potentiometer 330.

In case that it becomes desirable to operate the amplifier circuit 504 directly and without reference to any of the other modes of operation, this may be accomplished by an external means such as the additional buttons 604 and 605 shown in FIG. 4. Depression of button 604 is effective to connect a source of D.-C. potential 344 shown in FIG. 3 to the amplifier circuit 504. A stem 640 of the actuated button, shifts its associated contact bar 645 to accomplish the closure of contacts 646 and 647. Relay 606 is thereby energized through the circuit completed through the closed contacts and the D.-C. source 624. As a result the relay 606 contacts 606–1 and 606–2 are closed, and normally closed contacts 606–3 are opened, whereby any possible input through lead 415 is interrupted at contact 606–3, and a circuit between the D.-C. source 344 and the servo amplifier input lead 604 is completed through lead 340, contacts 606–1, resistor 341, lead 343, and contacts 606–2.

Additional interlock structure is provided to hold buttons 601, 602, and 603 inoperative when the amplifier operate button 604 is depressed. A bell-crank 642 is shown in FIG. 4 as being supported on a pivot so as to have an arm thereof underlie a pin 641 extending from the stem 640 of the operate button. By drivingly engaging the bell-crank, pin 641 rotates it to position a wedge shaped cam 643 on the bell-crank's opposite arm into the opening in locking bar slide 625, associated with the button 603. Depression of button 604 also acts to displace the retaining bar 627, whereby it is locked down by the bar overriding its release projection, and any one of the buttons 601, 602, and 603 then depressed, is released to inoperative position. Moreover, since wedge 643 is engaged within an opening of the locking bar 625, the latter is maintained stationary, and buttons 601, 602, and 603 are held inoperative. It is only by depressing the button 605 that a general release of the buttons may be effected. A camming projection of substantial length is provided on the button 605, in order that it will effectively displace the release bar 627, without itself being locked down in depressed position.

Transient-stability studies during which swing curves are recorded, are accomplished by operating the system in a compute mode. System operation for this purpose involves channels, the exact number dependent upon the requirement of the problem under study. Reference is hereinafter made particularly to operations effectuated in channel 10, since each of the other activated channels including channels 20, 30, etc., function in a corresponding manner. System operation also requires that these other channels also function to interact with channel 10, and with each other. After the impedance decade boxes of the network analyzer have been suitably adjusted to provide each of the electronic amplifiers which simulate the generators therein, with a predetermined constant power load, system operation is established by simultaneously depressing a compute button in each of the interacting channels. As a result, predetermined relays in each of the channels are made operative in a control arrangement such as shown in FIG. 4. In channel 10, a compute button 602 is held depressed by the retaining bar 627, whereas the other control buttons 601, 603 and 604 are locked in normal position by the locking bar 625 and crank elements 641, 642, 643 coacting with the bar 625. The latter having been shifted one-fourth of a stem opening in the bar, by the cam on the stem of button 602 blocks the cams on buttons 601, 603, and crank element 642. A contact bus bar 634 having been displaced by the movement of button 602, closes contacts 635, 636 and 637, whereby relays 610 and 611 are energized in circuits including the D.-C. source 624. Relay 610 having been made operative, actuates its contacts whereby normally closed contacts 610–2 in lead 415, are separated to disrupt the short circuit across the integrators, and contacts 610–1 are closed to complete a circuit through normally closed contacts 606–3, for transmitting the error signal from the differential resistance circuit 502 to the servo amplifier circuit 504. Operated relay 611 closes its contacts 611–1, and 611–2, whereby the integrator circuits 401 and 402, and their associated circuit elements, are joined to the over-all channel circuits. Since relay 606 is not operated in the compute mode, its contact sets 606–1, and 606–2 remain open, removing from the active circuits those connections through leads 340 and 343 which permitted operation of the channel by any external means. Relay 608 which also remains in its normal condition, maintains the normally closed contacts 608-1 closed to provide A.-C. current to energize the magnetic amplifier and servo motor. Appropriate circuits are thereby completed in channel 10, as they are in the same way also completed in the other interacting channels to prepare all these channels for the system operation in a compute mode.

A further teaching of a structural embodiment of a push button arrangement in the nature of that shown by the schematic of FIG. 4, may be found in the disclosure of U.S. Patent No. 2,086,605, issued to B. Copper on July 13, 1937.

*Automatic recorder*

Figure 5:
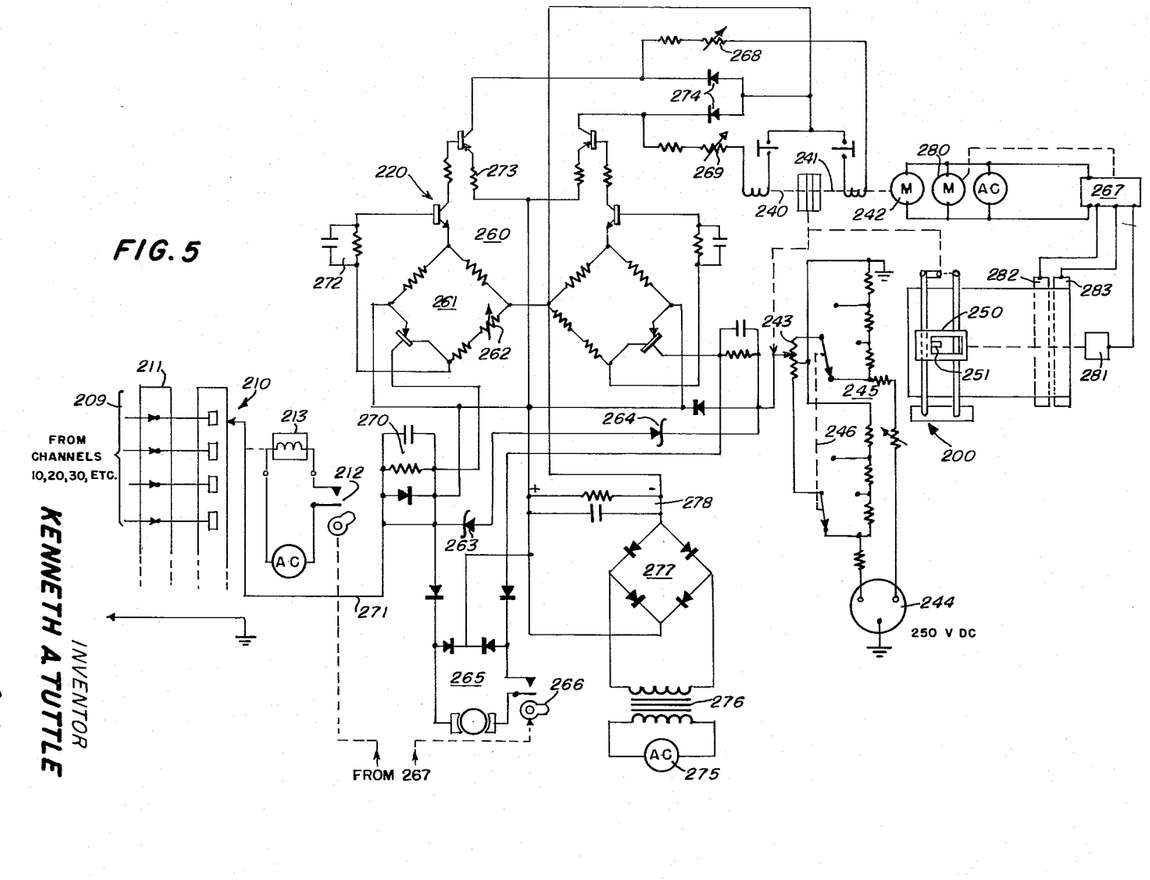
FIG. 5 is a schematic showing of the circuits controlling the operation of the automatic recording apparatus.

System operation produces the multiplicity of channel outputs which are received in the automatic recorder 200, as the signals for controlling the recorder to plot the swing curves. The recorder apparatus as shown in FIG. 5 receives these signals as inputs 209 and makes a record according thereto on a time sharing basis. Comprising this apparatus is a D.-C. servo, self-balancing electromechanical system made operative to translate the individual input voltages received from the channels on lines 586, 557, 558, etc., to high speed displacements of the recording mechanism. Continuous and sequential channel selection is achieved by means of a nonshorting rotary stepping-switch commutator arrangement 210, and abscissa displacements of the record material is caused to occur in synchronism with the commutation of the various inputs and at precise time intervals. The rotary switch is connected through a patch panel 211, on which plug wire connections permit channel inputs to be connected in any desired sequence. A timing switch 212 activates a stepping relay 213, driving the switch contact for sequentially completing a circuit from a channel to a signal detecting-amplifying circuit 220. A self-cycling action is made possible through a circuit including an extra commutator contact and the home contact which are made common with a selected single channel.

Positional drive for a record making element 250, in the ordinate direction is obtained by means of a pair of electro-magnetic friction clutches 240 and 241, placed back-to-back, such that both clutches have parts driven continuously through a mechanical input for a small motor 242. One friction clutch plate of one clutch is driven in one direction while one friction clutch plate of the other clutch is driven in the opposite direction and common to output shafts from the clutches, are connections to a coupling for recording element 250, and a precision potentiometer 243. In the absence of a control input, a balance is in effect whereby the two mechanically connected clutch plates will remain stationary since the friction drive in one direction is exactly balanced by the friction drive in the other direction. A regulated D.-C. source 244 is connected to the potentiometer 243, through a potentiometer circuit 245. Ordinate scales in three ranges are made available to the recording apparatus by means of manually operable ganged switching means 246 in the potentiometer circuit. Alignment and zero positioning for the recording element 250, are accomplished in a conventional manner such as by a manually adjustment of the print head potentiometer case.

Control of the voltage selectively activating the electromagnetic clutches 240 and 241, is achieved through the detector-amplifier 220. On one side of a symmetrical arrangement of duplicate components constituting the over-all amplifier circuits, there is a three stage push-pull, direct coupled current, transistor amplifier 260. The first stage incorporates a bridge circuit 261 which contains a null trim control 262 for setting the amount of null current in the clutches. This provision is necessary to prevent leakage current in the first and second stages from becoming amplified and overdriving the amplifier. A pair Zener diodes 263, 264, are connected across the amplifier inputs to also prevent over-driving the amplifier. The remaining diodes at the input stage are for signal "steering" for the potentiometer signal, and for the signal from a tachometer system 265. Additional stability and braking action are obtained during the null position approach by means of the tachometer system 265, which is activated for approximately 25 percent of each record cycle. The tachometer circuit is such that maximum effect is obtained at the high traverse speed and overshoot tendencies of widely separated input voltages. Direct braking action on the traversing recording element assembly is provided by the tachometer in that its generated voltages activate the non-driving one of the paired clutches. Cam operated switch means 266, controls the operational timing of the tachometer system. A timing control unit 267, driven by a motor 280, comprises means coupled to the actuating cams of the timing switch means 212 and 266 whereby these switches are cyclically operated in a predetermined time relationship. Clutch power controls 268 and 269 are located in each clutch circuit to provide a means of equalizing the relative clutch holding energy. Variations in face friction and magnetic gap between the two clutches 240 and 241, are corrected by the clutch power controls. A capacitor-resistance circuit 270, in the input provides a lag circuit to overcome phases difference between the channel input on lead 271, and an answering output from the clutch positioned potentiometer 243. The capacitor-resistor circuit 272 between stages assists in the same manner. Emitter resistor 273 in the third stage of the amplifier, provides negative feed-back to improve stability at this point. Diodes 274, in short with the coils of clutches 240 and 241, quench the back voltage surge from these inductances to protect the power transistors in the last stage. Circuit power is provided from an A.-C. source 275 connected across a transformer 276, whose output is fed to a single phase full wave bridge rectifier 277. A smoothing circuit 278 is connected across the output of the rectifier.

Figure 6:
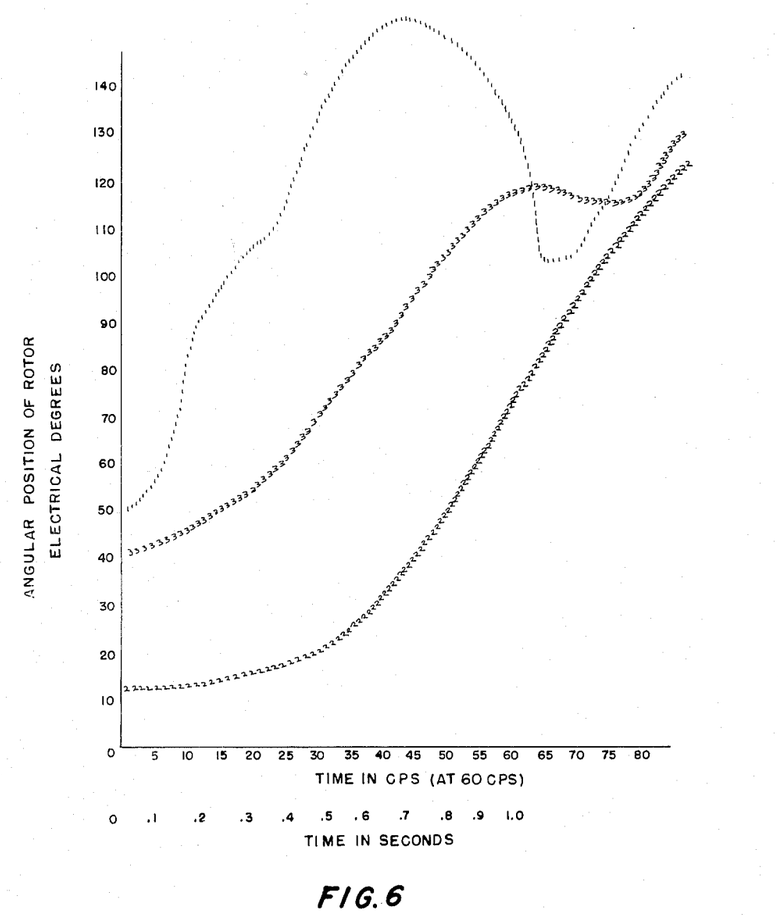
FIG. 6 is a graphical representation showing the swing curves automatically plotted by the recording apparatus.

The record making element 250 comprises a print head 251 which traverses the ordinate range on a double rod guide system and is coupled to the servo controlled clutches 240, 241 and potentiometer 243, through a wire cable and rotating capstan. Print head 251 is keyed to one guide rod through which print energy is transferred from a non-traversing spring and trigger assembly. Sequential ratcheting of the print head to position channel identifying numbers in printing alignment, is accomplished during the cocking stroke of each print cycle. Indexing and print triggering are made simultaneous with ordinate positioning of the print head for maximum utilization of the extremely short basic cycle time used in the apparatus. Individual graph papers are located and fed by a power driven standard typewriter assembly. In addition in controlling input timing at switches 212 and 266, the timing control unit 267 also comprises means such as rotating cams for selectively actuating switches in circuits to a print operate means 281, a paper feed 282, and a carbon feed 283. Consequently, the point-by-point indexing of the graph paper is synchronized with the commutator sampling rate. Operation of the recording apparatus 200 in accordance with the signal inputs at the patch board 211, is therefore effective to produce a recording showing a multiplicity of swing curves with reference to a single set of coordinates. As indicated by a group of exemplary swing curves shown in FIG. 6, curves which are required to intersect or overlap may be drawn without incompatible operation in the apparatus. This is made possible by the use of the unitary print head 251, which records during each basic abscissa time interval, the multiplicity of distinct ordinate or channel values which are sensed from the individual segments of commutator 210. Furthermore, that each of these ordinate values is identifiable by the distinct numerical figure printed as the record thereof. The easily distinguishable paths across the graph paper, defined by the repeated imprints of the various numerical values, makes evident representations of the separate swing curves which correspond to the various numerically designated channels. Other forms of graphical plotters are also applicable for reading the output signals from the channels and producing representations of swing curve such as shown in FIG. 6. Of particular interest in this connection are the recording instrument disclosed in the patent to Grisdale, No. 2,118,081, issued May 24, 1938, and the digital plotter disclosed in the patent to Rice, Jr., et al., No. 2,898,175, issued August 4, 1959.

Description of record made

Typical swing curves such as shown in FIG. 6, each indicate relative angular positions of a generator rotor (in electrical degrees), in respect to time in seconds or in terms of the cyclic time of the generator frequency. The particular generator rotor whose angular positions are set forth on a swing curve, is actually representative of the rotor in a hypothetical composite generator. Each generator entity G1, G2, G3, etc., shown in FIG. 1, is thus intended to represent the total operational effect at one power station wherein a number of synchronously operated A.-C. power generating machines have their outputs connected to the same output bus from which is drawn the current to supply the several areas shown connected to these power station generators. Relative angular position is considered to be represented by the curves in that the rotor angles shown at zero time, or the starting point for the curves, merely indicate the positions of the various rotors in respect to each other, and do not necessarily specify the actual rotor angles which are to be found in the particular machines. In any case, under ideal operational circumstances, the angular relationships among the respective generator rotors represented by the curves, remain substantially constant whereby the curves would all follow the same course on lines parallel to each other. As hereinfore indicated, the various generators G1, G2, G3, etc., are continually interacting such that a disturbing occurrence at any one point in the interconnected power transmission network would produce an effect albeit to different extents, on each of the generators. It is these separate effects which individually may vary widely in character and degree, that change the load demanded at the output terminals of each of the various generators involved. Accordingly, such changes in the loads required of the generators upset the equilibrium of the forces placed on the generators, whereby the mechanical driving forces thereon which continue unchanged, produce acceleration forces upon the rotating parts thereof. Such acceleration forces in turn produce the phase angle displacements of the rotors which cause transient instabilities in the power generating system. Even though governor apparatus is provided to control the application of the driving forces directed to rotate the field windings of the usual large size A.-C. generator, it should be appreciated that the almost instantaneous character of an electrical disturbance, and the rapid occurrence of the effects produced as an aftermath thereof, do not permit a governor to act in time to prevent a build-up of an acceleration force upon the generator's rotating parts. The swing curves shown in FIG. 6, are therefore to be understood as indicative of events occurring before any governor action comes into play.

System operation

A fault such as a short circuit in one of the transmission lines of a power network comprising several synchronous generators supplying a fixed load, would as was previously indicated, cause an almost total reduction of the resistive or real power load in the line affected by the fault, as well as occasion shift of load between the generators. That part of the over-all load connected through the faulty line, would be shifted from the one or more generators relatively near the fault and closely associated with supplying that part load, to the other generators more distantly related to the load in the faulty line, and in proportions primarily determined by the distances that these other generators are located relative to the point at which the fault occurred. Theoretically, loss of load on an actual generator should tend to speed it up, and a load gain should slow down a generator. However, a synchronous generator does not change speed, but instead obtains a small relative shift between its rotor and stator parts. In that event, the sine wave characterizing the generated A.-C. voltage will advance or be retarded relative to its normal time reference axis, by an angle measured in electrical degrees, commensurate with the relative size of the load change on the generator. This phenomenon of generator voltage phase angle shift is reproducible in the electronic amplifiers simulating the generators, since the outputs of such amplifiers are duplicates of their grid voltage supply, but with additional energy made available. Thus, in the system according to the present invention, phase angle variations in generator output voltages are effectively simulated by impressing on the grids of the tubes in the amplifier stages, regulated voltages having angularly phased sine waves which correspond to that which would characterize the generator voltages. Therefore by regulating the relative phase angles of the sine waves defining voltages impressed on the grids of the amplifier tubes, to continuously correspond to those voltage phase angle shifts which would be experienced in actual generators subjected to instantaneous load changes, the amplifiers such as 125, 126, 127 etc., may be made to simulate such actual generators as they function in a network.

Phase shifting of the amplifiers' grid voltage sine wave relative to the phase of the plate voltage, is accomplished in the system as shown in FIGS. 1 and 3, by means of selectively positioning the rotors in the phase shifting control transformers of the various channels. A basic time reference for this sine wave control is fixed by the phase positions of the A.-C. voltages in the three-phase lines 560, which form a common A.-C. current source for supplying the three-phase windings of the stators of the control transformers. It is therefore the particular position taken by the single phase regulator rotor such as rotor 594 in channel 10, that determines the angular phase relationship of the sine wave defining the voltage output from the rotor. In channel 10 for example, this regulated output voltage is supplied on line 599 as the grid control voltage input to the amplifier 125. Manifestly, the phase angle of the sine wave defining an input control voltage for the grids of any selected one simulation amplifier, may be conveniently and accurately altered in its relationship to the regulated phase angles of control voltages supplied to the other simulation amplifiers, by merely positioning the transformer rotor associated with the selected one amplifier. This follows since phase angle regulation of all voltage inputs to control the amplifier grids are ultimately related to the one basic angular time reference established through the three phase voltage source on lines 560, common to all the transformer stators.

To summarize the system operation, any generator's loss or gain of load from the constant network analyzer load, such as would be caused by jumping a network analyzer circuit connecting cable to ground to simulate a short circuit fault in a transmission line, is sensed as a change of power at a simulation amplifier's output terminals. However, such load changes as might be imposed on this amplifier's output, will not change its output voltage, since the relatively large normal output of the amplifier, and its otherwise inherent circuit design, are determinative of a constant voltage regulation therefor. This amplifier's power is detected in the channel associated therewith, and measured to produce an equivalent D.-C. potential. A summation circuit in the channel compares this equivalent potential with a reference potential representing normal or rated power of the generator being simulated. Any potential difference resolved by the comparison becomes indicative of acceleration forces acting on the simulated generator's rotor, and when passed through two integrator circuits, it is derived as a potential indicative of the phase angle displacement to which the simulated generator's rotor would have been subject due to the acceleration forces produced by the aforesaid change in load demanded of the generator. A servo system made operative in response to the phase angle displacement potential, positions a rotor in a phase shifting control transformer, whereby the phase angle of the sine wave defining a single phase voltage in the rotor is correspondingly displaced relative to a fixed three phase voltage in the transformer's stator. This regulated voltage from the rotor is received in the grid circuit of the amplifier to control its power output accordingly. Consequently, the amplifier's power output as changed by the network load disturbance, is now redefined in terms of a changed phase relationship in its voltage. Also repositioned by the activated servo system is a slider normally zero-centered on a potentiometer, from which is thereby derived a control voltage received in an automatic recorder apparatus. In response to this control voltage, the recorder renders operative a print head arrangement to plot a curve relating the changes in phase angle displacement to time.

More particularly, the system operation causes a multiplicity of channels to be simultaneously operative to detect load changes in the network analyzer wherein each one of said channels becomes uniquely responsive to the particular load changes it detects. As noted previously, a change or disturbance such as a short circuit, in a network of lines and loads, will change the power output required of the generator. When the change is due to a short circuit, a decrease in output power is normally detected, and ordinarily the generator closest to this network change will see the greatest change in its power output. Since as explained there is an absence of immediate governor action to control power input when such a load disturbance occurs, the input power distinctive to each of the generator simulating amplifiers may be assumed to be constant during the time period under consideration. As a result an excess of power is made potentially available for output which is not absorbed by output load. The momentary input and output power difference, which after detection and integration in the associated channel circuit, produces the previously disclosed phase angle control signal, will be seen to increase as the output decreases. However, this momentary phase angle control signal generates only a slight increase in the generator phase angle in the extremely short time interval involved, and when the operation of the generator simulating amplifier is modified by this small control input, it picks up or absorbs an increase in load corresponding to only a small part of the difference between the input and output powers applied thereto. Nevertheless, this process continues to occur over many short intervals of time until the input power difference over the output required at a particular instant, is overcome and the disturbance effect is removed. In any case, the summation of the small phase angle increments is not usually sufficient for causing the generator to pick up all the load that is dropped when the disturbance was first applied, since the total time of disturbance is too short. It is evident therefore that the power output to the particular channel involved, is eventually changed, and some of the power first demanded of it, is redistributed to other channels in the over-all system. These channels are consequently further disturbed, although to a lesser extent than the initiating disturbance such as was due to the network short circuit. Even though the line fault itself may be eliminated almost immediately, such power variations that are produced at the amplifiers' outputs, cause a multitude of transient power effects to continuously pass through the network analyzer for a significant period of time thereafter. As a result, rotor phase displacements to different extents continue to be made evident in the individual channel operations until the simulated acceleration forces produced by the power changes are diminished to an ineffectual point. It is then that the consequent redistribution of the network analyzer load among the various generating simulating amplifiers, has been stabilized. In contrast to the aforementioned compute mode operation, the constant power mode functions to cause the phase angle change signal to be effective to restore the generator simulating amplifier output power immediately. This follows since the power difference detected in this instance, is not integrated in the channel circuit, and the factor of time does not enter into determining the measure of the channel's phase angle control output to the generator simulating amplifier.

In FIG. 6 are shown plotted curves 1, 2, and 3, which are exemplary of those plotted in response to system operation of the present invention. Since the pertinent effects varying the phase angle in the operation of the actual generators occur within fractional parts of a second, these curves are produced in the system of the invention on a time base 120 times real transient time which is shown as the abscissa scale in FIG. 6. A fault introduced to the network analyzer at zero time, and which in the actual A.-C. generator is cleared at .067 of a second later, initiates the previously described interrelated operational effects in the channels such as associated with generators G1, G2 and G3, whereby plotted indications of phase angle displacements become apparent within the first tenth of a second of the operation being simulated. Prior to the fault, the curves 1, 2 and 3 followed paths parallel to each other, although angularly displaced relative to each other to the extent indicated on the ordinate axis at zero time. Such constant relative displacement between the curve is indicative of network operation having transient stability. Although curves 2 and 3 show a tendency in the generators they represent, to achieve relative stability very soon after the fault was applied, the generator of curve 1 shows a large measure of relative instability in the system operation. However, after about one second of random relative angular displacements, the curves start to follow substantially the same slope indicating a return of network operation in which the transient effects have been stabilized. A leveling off or normalizing of the operational effects such as represented by these curves, would eventually occur at about fifteen seconds after the fault. At that time the inertia effects on the rotor have subsided, and the driving inputs to the generator's rotor shaft have come under the regulating control of the generator's speed governing apparatus. For an understanding of stability studies utilizing plotted data in the nature of that shown in FIG. 6, reference should be made to chapter VII of the aforementioned text Power System Stability, volume 1.

While a preferred embodiment of the invention has been illustrated and described herein, it is to be understood that the invention is not limited thereby, but is susceptible of changes in form and detail.

What is claimed is:

1. A system for automatically plotting swing curves representing the transient stability characteristics of A.-C. power generators in a power generating and transmission network, comprising means for simulating the operation of the said network, including a plurality of power generating means each comprising power output control means for simulating the A.-C. power generators of said network, a corresponding plurality of analyzing and computing channels, each one of said channels respectively connected to a different one of said power generating means, each of said channels comprising means to produce a potential representative of the difference between the power output of the generating means connected thereto and the normally rated output of said generating means, computing means operative to integrate twice the said difference potential and produce a potential representative of the electrical angular shift of the rotating field in an A.-C. power generator simulated by the connected power generating means, a servo apparatus including an operational amplifier and positioning drive motor, said amplifier controlling the drive of said motor in response to said angular shift potential, a phase shifting control transformer comprising a rotor and a stator energized to provide a predetermined electrical phase angle as a reference for defining the electrical phase angle of a potential in the rotor, a slider contact movable relative to an energized potentiometer, an automatic recording means for plotting said swing curves, comprising electrically controlled means to position a printing head in said recording means, said controlled positioning means made operative in response to an input potential from said slider contact, said servo motor drive being made operative to move the contact slider relative to its potentiometer, and to position said transformer rotor relative to its stator to define in said rotor potential the said electrical angular shift of said generator field, said rotor potential being transmitted to said power control means of said connected generating means, to redefine the power output thereof in accordance with the said electrical angular shift.

2. A system wherein a simulator of an A.-C. power generating and transmission network is automatically analyzed, and swing curves representing the transient-stability characteristics of the A.-C. power generators of said simulated network are automatically plotted, comprising an arrangement of interconnected graduated impedance means adjustable for presetting the said simulator with an electrical load corresponding to the loading conditions in the said A.-C. power transmission network, a plurality of power generating means each having an output circuit and a power output control means as parts thereof for simulating the operation of the A.-C. power generators in said network, and each made operable to simultaneously energize the said interconnected impedance means, a corresponding plurality of power analyzing channels, each of which is electrically connected to the output circuit of a different one of said plurality of power generating means, and comprising means to measure the power supplied in said output circuit to the arrangement of interconnected impedance means, and to produce a first potential corresponding to said power measured, an electrically energized adjustable means settable to provide a second potential representing a measure of the normally rated output power of the power generating means in electrical connection with said channel, a first potential difference circuit responsive to said first and second potentials to provide a first difference potential indicative of any change in the power output of the said connected power generating means from the said normally rated power output thereof, double integrator circuits receiving the said first difference potential and operating thereon to successively integrate said first difference potential and produce an output potential representing an electrical phase angle displacement in the said A.-C. power generator being simulated by the said connected power generating means as a result of the change of output power indicated by the first difference potential, a second difference circuit connected to the said double integrator circuits and producing an output in response to inputs comprising the double integrator circuits output, a servo arrangement comprising an operational amplifier and positioning drive motor energized therefrom, said amplifier producing a motor control output potential in response to the output potential of said second potential difference circuit, a phase shifting control transformer comprising a rotor and a stator fitted with a plurality of radially positioned interconnected coils respectively connected to the phased lines of an A.-C. source and providing a revolving field having a fixed electrical angular relationship in reference to which the rotor is positionable, said servo drive motor being operative to position elements comprising first and second slider contacts and the said transformer rotor whereby a potential output from said rotor is phase shifted in reference to the fixed phases of its stator potential, to correspond to the phase angle displacement defined by the potential output of said double integrator circuits, said positioned slider contacts being operative to select potentials from respective energizing potentiometer circuits, the potential on said first slider being transmitted to means automatically plotting swing curves in response to the potentials transmitted thereto, and the potential on said second slider being transmitted as a servo feedback to the said second potential difference circuit, said rotor output potential being transmitted to said power output control means of said connected power generating means, whereby the immediate power output of the latter is redefined in accordance with the shifted phase angle of the rotor potential received in its power output control means.

3. A system for automatically plotting swing curves representing the transient stability characteristics of A.-C. power generators in a power generating and transmission network, comprising means for simulating the operation of the said network including a network load and a plurality of power generating means each comprising power output control means for simulating the A.-C. power generators supplying said network, a corresponding plurality of analyzing and computing channels, each one of said channels respectively connected to a different one of said power generating means, each of said channels comprising a power measuring apparatus producing a first voltage output in accordance with the power measured at the output of the correspondent power generating means, a voltage control means settable to determine a second voltage output in accordance with a predetermined rated power for the A.-C. power generator being simulated by the said correspondent power generating means, a first voltage summation circuit having electrical connections for receiving said first and second voltage outputs and providing a voltage at a terminal thereof commensurate with the difference between said first and second voltage outputs, a computing circuit comprising electrical connections operatively interrelating integrators and normally inoperative reset circuits therefor, a servo circuit comprising a servo drive motor having a source of power in circuit therewith, and an operational control circuit therefor, and first and second energized potentiometers, each having a voltage tap movable thereon, a phase shifting control transformer comprising an energized stator and a rotor positionable to assume predetermined electrical angular phase relationships to said stator, said rotor and the said first and second potentiometer taps being positioned by said servo motor drive, said rotor being in a circuit with the power output control means of said correspondent power generating means and providing a control potential thereto, an automatic recording apparatus having a self-balancing electro-mechanical means including a detector-amplifier follow-up means operable to position a print head thereof, said means being in circuit with said first potentiometer tap and operably responsive to the voltage sensed thereat, a second voltage summation circuit having an electrical connection with said second potentiometer tap and responsive to the voltage sensed thereat and a voltage provided on a second input circuit thereto, electrical connections operable to transmit an output from the second voltage summation circuit to an input terminal of said servo operational control circuit, first circuitry comprising circuit connection means adapted to electrically associate said terminal of said first voltage summation circuit and said electrical connections of said computing circuit whereby said integrators are operative in response to receipt of said terminal voltage in said computing circuit to supply a computed output voltage to said second input circuit of said second voltage summation circuit, and second circuitry comprising further circuit connection means adapted to electrically associate said terminal of said first voltage summation circuit and said second input circuit to the second voltage summation circuit whereby said second input circuit is operative to supply said terminal voltage to said second voltage summation circuit, and system operational mode control means comprising a plurality of relays in circuit with an energizing source therefor through open switches, a plurality of pushbuttons, each being individually operable to close predetermined ones of said open switches to energize selective ones of said relays, normally open and normally closed relay contacts actuated by said energized relays, said actuated contacts being effective in said circuit connection means of said first and second circuitry to switch the operation of said system between a mode for computing and plotting swing curves of said transient stability characteristics of simulated operation of said power generating means in said network and a mode for simulating a constant power output from a said power generating means to said network load.

4. In the automatic swing curve plotting system of claim 3, a third circuitry including said terminal of the first voltage summation circuit and the input terminal of said servo operational control circuit, said system operational mode control means comprising among the relay contacts thereof normally closed first contacts in said servo motor power source circuit, normally open second contacts in said normally inoperative reset circuits for said integrators, and normally closed third contacts in said third circuitry, whereby operation of a predetermined one of said pushbuttons is effective to open the said normally closed first and third contacts and to close the normally open second contacts, and thereby switch said system from one of said power output operational modes to a standby condition.

5. A system for plotting swing curves representing the transient stability characteristics of A.-C. power generators in a power generating and transmission network, automatic plotting means comprising means for positioning a print head relative to a record element, means for simulating the operation of the said network including a plurality of power generating means each comprising a continuously operable amplifier controlling the power output thereof for simulating the A.-C. power generators of said network and each set to normally produce a predetermined power output indicative of the rated power of the generator simulated thereby, a corresponding plurality of analyzing and computing channels, each one of said channels respectively connected to a different one of said power generating means, each of said channels comprising means responsive to the power output of the generating means related to said channel, and operative to produce a voltage varying in magnitude in accordance with changes of the said power output in respect to the predetermined power output set for the said generating means, computing means comprising summing amplifiers responsive to said voltage produced to provide a potential equivalent to the second integral of the magnitude of said voltage and corresponding to an angular displacement quantity, a servo follow-up arrangement comprising a positioning drive motor, and an operational control circuit therefor responsive to said displacement quantity potential to operate the servo drive motor to simultaneously position control transformer means supplying operational control potentials to said amplifiers of said generating means, and further means controlling the means for positioning a print head in said automatic plotting means.

6. In the swing curve plotting system of claim 5, the said means operative to produce a voltage in accordance with changes in the power output of a related power generating means, comprising an A.-C. wattmeter operable in response to power measured at output terminals of said power generating means to produce a D.-C. output having a voltage commensurate with the power measured, an adjustable potentiometer circuit selectively energizable by a negative or positive voltage source providing at an output tap a predetermined D.-C. voltage, and a voltage summation circuit comprising a plurality of resistors, electrically connected to said wattmeter output and said potentiometer tap, and effective to provide at a terminal in said summation circuit a D.-C. voltage corresponding to the difference between the D.-C. voltage outputs at the potentiometer tap and wattmeter.

7. In the swing curve plotting system of claim 5, a system operational mode control arrangement comprising a plurality of relays each of which comprises several actuatable contacts, energizing circuits for said relays comprising a plurality of normally open operable switches, a plurality of pushbuttons normally maintained in an unoperated position and cooperating with means to interlock and to hold in position said pushbuttons made operative in response to moving a pushbutton to an operated position, predetermined ones of said switches being closed by movement of selected ones of said pushbuttons to an operated position, whereby the relays related to said closed switches are energized to actuate their contacts, in each of said channels a plurality of lead lines joining in electrical circuits the means producing a voltage in accordance with changes in power output of the related generating means, the computing means, and the servo follow-up arrangement, said lead lines having as an integral part thereof the actuatable relay contacts, whereby movement of one of said pushbuttons to operated position activates said interlock and hold means to maintain the pushbutton operated, and completes electrical circuits between the means producing a voltage in accordance with changes in power output of the related generating means and the computing means, and between the computing means and the servo follow-up arrangement, whereby the positioning drive of the servo arrangement is controlled in accordance with the second integral of the said voltage produced as a result of the power changes in the output of the said related generating means, and movement of another of said pushbuttons to operated position releases the said operated one of said pushbuttons to normal position whereby the said other pushbutton is maintained in operated position, and the electrical circuits previously completed by the operation of the said one pushbutton are interrupted, and other electrical circuits are completed joining the said means producing a voltage in accordance with power changes to said servo follow-up arrangement whereby the positioning drive of the servo arrangement is controlled directly in accordance with the said voltage produced in accordance with power changes.

References Cited by the Examiner
UNITED STATES PATENTS

| | | |
|---|---|---|
| 2,489,106 | 11/1949 | Peterson. |
| 2,577,003 | 12/1951 | Curtis _________ 235—184 X |
| 2,999,638 | 9/1961 | Brownlee ________ 307—57 X |
| 3,001,714 | 9/1961 | McKinley et al. _____ 235—184 |
| 3,027,084 | 3/1962 | Harder. |
| 3,173,002 | 3/1965 | Starr ___________ 307—57 X |

MALCOLM A. MORRISON, *Primary Examiner.*

I. KESCHNER, *Assistant Examiner.*